(12) United States Patent
Dalal et al.

(10) Patent No.: US 10,887,278 B2
(45) Date of Patent: Jan. 5, 2021

(54) SYSTEMS AND METHODS FOR DISCOVERY OF BRAND-REGISTERED DOMAIN NAMES

(71) Applicant: PROOFPOINT, INC., Sunnyvale, CA (US)

(72) Inventors: Gaurav Mitesh Dalal, Fremont, CA (US); Ali Mesdaq, San Jose, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 64 days.

(21) Appl. No.: 16/244,955

(22) Filed: Jan. 10, 2019

(65) Prior Publication Data

US 2020/0228494 A1    Jul. 16, 2020

(51) Int. Cl.
*G06F 15/16*         (2006.01)
*H04L 29/12*         (2006.01)
*G06F 16/2458*       (2019.01)
*G06F 16/951*        (2019.01)

(52) U.S. Cl.
CPC ........ *H04L 61/302* (2013.01); *G06F 16/2468* (2019.01); *G06F 16/951* (2019.01); *H04L 61/1511* (2013.01)

(58) Field of Classification Search
CPC ............... H04L 61/302; H04L 61/1511; G06F 16/2468; G06F 19/951
See application file for complete search history.

(56) References Cited

U.S. PATENT DOCUMENTS

| | | | |
|---|---|---|---|
| 2006/0230039 A1* | 10/2006 | Shull | ................ H04L 63/08 |
| 2008/0022013 A1 | 1/2008 | Adelman | |
| 2014/0006439 A1 | 1/2014 | Kothapalli | |
| 2015/0154720 A1* | 6/2015 | Matkowsky | ......... G06Q 50/184 |
| | | | 705/310 |
| 2016/0055490 A1 | 2/2016 | Keren et al. | |
| 2018/0013789 A1 | 1/2018 | Damian | |
| 2019/0364011 A1 | 11/2019 | Nguyen | |
| 2020/0099716 A1* | 3/2020 | Sjouwerman | .......... G06N 20/00 |

OTHER PUBLICATIONS

International Search Report and Written Opinion for International Application No. PCT/US2019/064745, dated Feb. 21, 2020, 7 pages.

* cited by examiner

*Primary Examiner* — Ryan J Jakovac
(74) *Attorney, Agent, or Firm* — Sprinkle IP Law Group

(57) ABSTRACT

Taking a zero-configuration approach, a domain name discovery system utilizes, in an iterative process, WHOIS data and infrastructure data for a seed domain to automatically discover domain names having registration and/or infrastructure details that match those of the seed domain. Registration information such as a registered email address associated with a domain name discovered through WHOIS data matching or infrastructure data matching is utilized in a reverse lookup for domain names having infrastructure or WHOIS registered information that fully matches the information associated with the domain name discovered through the iterative process. Domain names discovered through WHOIS data matching, infrastructure data matching, and reverse lookup can be presented through a user interface on a client device communicatively connected to the domain name discovery system over a network. The domain name discovery can be performed periodically or in near real time responsive to receiving a new seed domain.

20 Claims, 7 Drawing Sheets

FIG. 3

ADD PROTECTED DOMAINS

Enter one domain to protect per line

Enter the domains you wish to protect. Put each domain on a new line. For a given parent domain it is not necessary to enter every TLD variation e.g. domain.com, domain.co.uk, domain.de.

Add Domains

Threat Center | Discover | Patrol
Domain ▼ Config Domain Detections URL Detections Add Watched Ignored Domains Alerts Image Library Protected Domains ▼ DOMAINS
mycompany.com
Added on: Jul 23 2018 2:08 PM

✏ BATCH EDIT
🗑 REMOVE
⊖ DEACTIVATE
✏ EDIT

Privacy Policy | Terms of Service | Support

Edit Protected Domain

This domain is privately registered. Please provide as much of the information below as possible. Without it, we cannot identify Brand Owned domains.

To help in better identifying all brand owned domains please provide any details from Whois registrations that clearly identify domains being owned by your organization:

REGISTRANT COMPANY NAME +
[Company Name]

REGISTRANT OR ADMINISTRATIVE EMAIL ADDRESS +
[user@mycompany.com]

Infrastructure:

IP OR RANGE OF IPS +
[Single IP or two separated by (-)]

ASN +
[ASN]

Metadata:

ENTER UNABBREVIATED TEXT +
[United States America]

Enter only if this domain is an abbreviation (Ex: usa.com).

[Cancel] [Save]

| Detected Domains | | | | | | |
|---|---|---|---|---|---|---|
| ▼ DETECTED DOMAINS (1546) | | | | | | |
| Domain | Classifications | State | Registered Date | Registered Email | Registrar | ASN |
| retirementsearch... | Brand owned defensive | Down | 2018-07-26 | | | 0 |
| mycompany.org.pe | Brand owned defensive | Live | | hostmaster@mycompa... | CompanyInc. | 12345 |
| mycompanyretirement... | Brand owned defensive | Down | 2018-07-26 | | CompanyInc. | 0 |
| mycompany.co.tt | Brand owned defensive | Live | | | | 12345 |
| mycompany.bs | Brand owned defensive | Live | | | | 12345 |
| mycompany.net.ec | Brand owned defensive | Live | 2004-07-23 | hostmaster@mycompa... | CompanyInc. Registration URL: | 12345 |

FIG. 6

SYSTEMS AND METHODS FOR DISCOVERY OF BRAND-REGISTERED DOMAIN NAMES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to network solutions for domain name protection. More particularly, this disclosure relates to systems and methods for discovery of brand-registered domain names on the Internet, useful for domain name protection.

BACKGROUND OF THE RELATED ART

In today's highly connected world, many companies not only have an online presence, they often have or own multiple domains. This is particular the case for companies interested in protecting their brands in different geographical locations, jurisdictions, and/or regions. For example, currently, the Internet has the following top-level domains (TLD): .com, .org, .net, .int, .edu, .gov, and .mil, all of which are administered by different entities.

Of these TLDs, .com and .net are open TLDs that any person or entity is permitted to register. This means that any potential competitor, cybersquatter, bad actor, and/or even an innocent entity may, knowingly or unknowingly, hijack a company's domain name (e.g., for the company or for a brand of the company), dilute a trademark owned by the company (e.g., by registering a domain name that is the same or similar to the trademark), or otherwise adversely affect the company and/or the company's brand. For instance, a bad actor may intentionally misspell a brand or company's domain name (e.g., misspelling "wellsfargo.com" as "wellsfaargo.com," "wellfargo.com," "welllsfargo.com," etc.)

Domain name hijacking and cyersquatting are security risks known to those in the network security field. Generally, domain name hijacking refers to acts where a registered domain name is misused or stolen from the rightful name holder and cyersquatting refers to the registering, trafficking in, or using an Internet domain with bad faith intent to profit from the goodwill of a trademark belonging to someone else.

Adding to the complexity of domain protection is the different types of domains that can be used on the internet in addition to the TLDs listed above. For example, there are hundreds (255 as of May 20, 2017) of country code top-level domains (e.g., .us, .eu, .cn, .gr, etc.), internationalized country code top-level domains in different languages/scripts (e.g., .eio, .中国, .ελ, etc.), generic top-level domains in English (e.g., from .academy, .baby, .cab, to .zero, .zone, etc.), country-specific generic top-level domains (e.g., .shouji for "mobile phone" in Chinese, .moi for "me" in French, .epost for "e-mail" in German, etc.), language-specific generic top-level domains (e.g., .com can be 公司 in Chinese, .ком in Cyrillic (Russian), कॉम in Hindi, קום. in Hebrew, .コム in Japanese, .คอม in Thai, etc.), geographic top-level domains (e.g., .africa, .asia, .boston, .kiwi, etc.), internationalized geographic top-level domains (e.g., 佛山 for Foshan, China, etc.), brand top-level domains (e.g., from .aaa to .zippo), internationalized brand top-level domains in different languages (e.g., .谷歌 for Google in Chinese, 삼성 for Samsung in Korean, etc.), and special-use domains (e.g., .example, .local, .test, etc.).

Further, a company or brand can have or use different business entities across different geographic locations. Brand offices at different geographic locations can use different registrars for domain registration across different geographic locations. Brands can use different infrastructure to host same brand domain names. Brands can have their registration detail private. A brand can acquire another brand and the registration details of the acquired brand can be quite different from the original brand. Brand domain names can be managed by a third party service. Registration details can be proxied using a third-party service company. Due to these and other challenges in domain name registration types and processes, it is technically difficult to discover domain names owned by brand names automatically. Accordingly, existing solutions mostly rely on human analysts manually analyzing domain name registration data using the WHOIS database.

According to the Internet Corporation for Assigned Names and Numbers (ICANN), "WHOIS" is the system that asks the question, "who is" responsible for a domain name or an internet protocol (IP) address? ICANN regulates domain name registration and ownership and maintains a WHOIS database—a widely used Internet record listing that identifies who owns a domain and how to get in contact with them.

Every year, millions of individuals and entities such as businesses, organizations and governments register domain names. An entity or person that registers a domain name is referred to as a "registrant." Each registrant must provide identifying and contact information which may include: name, address, email, phone number, and administrative and technical contacts. The registrant-provided information is often referred to as "WHOIS data." The WHOIS database is not a single, centrally-operated database. Rather, it is managed by independent entities known as "registrars" and "registries." A registrar is an organization that is authorized by ICANN to register domains within a TLD. A registry refers to a database of names assigned within a TLD.

In view of the foregoing, there is a need for automatic and scalable discovery of brand-registered or brand-owned domain names on the Internet. Embodiments disclosed herein can address this need and more.

SUMMARY

An object of the invention is to provide a technical solution for automatic and scalable discovery of brand-owned and registered domain names on the Internet. Such a technical solution can aid in domain protection, significantly reduce digital risk, eliminate man-made errors, and streamline the discovery, management, and processing of brand-owned domain name registration information.

To achieve this object, embodiments disclosed herein take a rule-based, zero-configuration approach to discovering brand-registered domain names. In some embodiments, a domain name discovery system operating on a server computer is operable to receive a seed domain (e.g., from a client device communicatively connected thereto over a network)

and obtain WHOIS data and infrastructure data for the seed domain. The domain name discovery system is operable to determine, from the WHOIS data containing domain name registration information for the seed domain, whether the domain name registration information for the seed domain is private.

In some embodiments, the domain name discovery system may initiate different types of discovery procedures depending upon whether the domain name registration information for the seed domain is private. For instance, responsive to the domain name registration information for the seed domain being private, the domain name discovery system is operable to perform an infrastructure data matching procedure utilizing the infrastructure data for the seed domain. Otherwise, the domain name discovery system is operable to perform a WHOIS data matching procedure utilizing the WHOIS data for the seed domain.

For each domain name found through the infrastructure data matching procedure or through the WHOIS data matching procedure, the domain name discovery system is operable to perform a reverse lookup process or procedure to look for additional domain names. This domain name discovery process is performed iteratively until no domain name is found.

In some embodiments, the reverse lookup procedure can include obtaining, from a WHOIS database, WHOIS data for each domain name discovered through the infrastructure data matching procedure or through the WHOIS data matching procedure, determining a registered WHOIS field value such as a registered email address from the WHOIS data for each domain name thus discovered, and querying the WHOIS database for domain names having an email address that fully matches the registered email address. In some embodiments, the domain name discovery system is operable to generate a user interface for presenting, on a client device communicatively connected to the domain name discovery system, domain names discovered through the WHOIS data matching procedure, the infrastructure data matching procedure, and the WHOIS reverse lookup procedure. In some embodiments, the reverse lookup procedure can, additionally or alternatively, perform reverse lookup using infrastructure data in a similar way.

In some embodiments, the reverse lookup procedure further includes, prior to determining a registered email address from the WHOIS data, determining whether a first WHOIS field for the registered email address is empty and, responsive to the first WHOIS field being empty, determining whether a second WHOIS field associated with the registered email address is empty. The domain name discovery system may perform this determination iteratively until a non-empty WHOIS field associated with the registered email address is found.

In some embodiments, the WHOIS data matching procedure can include performing a plurality of matches including a full match of a first registration detail in the domain name registration information for the seed domain, a fuzzy match of a second registration detail in the domain name registration information for the seed domain, and a domain match of any domain name registered using the seed domain. In some embodiments, the WHOIS data matching procedure is operable to output a domain name that has at least two registration details that fully match corresponding registration details of the seed domain, that has at least one full match and one fuzzy match, or that has at least one full match and one domain match.

In some embodiments, the infrastructure data matching procedure can include performing a plurality of matches including a full match of an infrastructure detail in the infrastructure data for the seed domain and a configuration parameter match of a user-provided configuration parameter of the seed domain. In some embodiments, the infrastructure data matching procedure is operable to output a domain name that has at least an infrastructure detail or a configuration parameter that fully matches a corresponding infrastructure detail or a user-provided configuration parameter of the seed domain.

One embodiment may comprise a system having a processor and a memory and configured to implement the domain name discovery method disclosed herein. One embodiment may comprise a computer program product that comprises a non-transitory computer-readable storage medium which stores computer instructions that are executable by a processor to perform the domain name discovery method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 3 depicts a diagrammatic representation of an example of a user interface of a domain name discovery and protection system according to some embodiments disclosed herein.

FIG. 4 depicts a diagrammatic representation of another example of a user interface of a domain name discovery and protection system according to some embodiments disclosed herein.

FIG. 6 depicts a diagrammatic representation of another example of a user interface of a domain name discovery and protection system according to some embodiments disclosed herein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
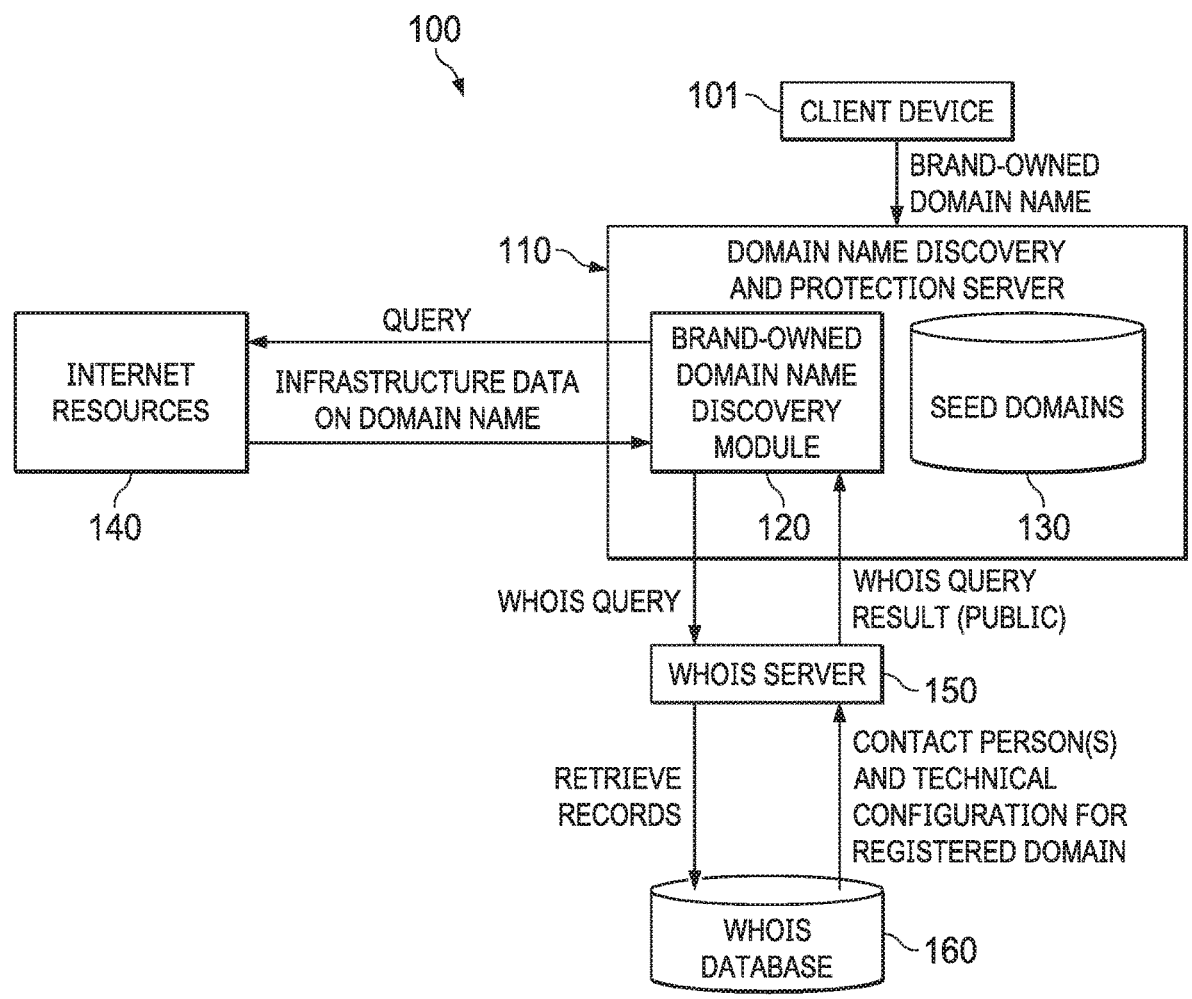
FIG. 1 depicts a diagrammatic representation of a distributed computing environment in which embodiments disclosed here are implemented.

FIG. 1 depicts a diagrammatic representation of distributed computing environment 100 in which embodiments disclosed here are implemented. As illustrated in FIG. 1, domain name discovery and protection (DNDAP) server 110 may comprise brand-owned domain name discovery module 120 and database 130 storing seed domains. In this disclosure, a "seed domain" refers to a domain name of interest, e.g., a domain name owned by a brand or a company. "iCloud.net" is an example of a domain name that is owned by the brand known as "Apple®" which, in turn, is own by the company "Apple Inc." According to Apple®'s public domain profile, the registrant "Apple Inc" is associated with over ten thousand domain names besides "Apple®." A registrant can also be a registrar. "Google LLC" is an example of a registrant that owns thousands of domain names and that is also a registrar.

In the example of FIG. 1, DNDAP server 110 is communicatively connected to client device(s) 101. In some embodiments, DNDAP server 110 is operable to receive or obtain a brand-owned domain name from client device 101 and store it as a seed domain in database 130. In some embodiments, brand-owned domain name discovery module 120 is operable to automatically process a seed domain stored in database 130 in search of any and all registered domain names that are currently associated with the registrant of the seed domain. This automatic discovery process, which is described in more details below with reference to FIG. 2, can be initiated whenever database 130 is updated with a new seed domain, on-demand as instructed by an authorized user (e.g., through an administrator interface, not shown), or per a schedule (e.g., every 24 hours).

In some embodiments, brand-owned domain name discovery module 120 is communicatively connected to Internet resources 140 such as domain name system (DNS). The DNS is a hierarchical decentralized naming system for computers, services, or resources connected to the Internet or a private network. A domain name is an identification string that defines a realm of administrative autonomy, authority or control within the Internet. Domain names are formed by the rules and procedures of the DNS. Any name registered in the DNS is a domain name. A DNS name server is a server that stores DNS records for a domain and that responds to queries against its database. The DNS records can store Internet Protocol (IP) addresses, pointers for reverse DNS lookups, domain name aliases, and infrastructure information that complements a registry's Registration Data Access Protocol (RDAP) and/or WHOIS services.

RDAP is a successor to the WHOIS protocol and can be used to look up relevant registration data from Internet resources such as domain names, IP addresses, and Autonomous System Numbers (ASNs). An ASN is a unique number that can be used globally to identify an autonomous system. With the ASN, an autonomous system can exchange exterior routing information with other neighboring autonomous systems. The ASNs are assigned by the Internet Assigned Numbers Authority (IANA), which is a function of ICANN. By querying Internet resources 140 (e.g., with an ASN, IP address, or company name), brand-owned domain name discovery module 120 is operable to obtain infrastructure information such as the owner of the IP address, the organization that controls the ASN, the domain registration date, the issuing registrar, and so on.

In some embodiments, brand-owned domain name discovery module 120 is operable to obtain and/or maintain a mail exchange (MX) record for a seed domain under processing. MX records are used by mail servers to determine where to deliver emails. In this case, brand-owned domain name discovery module 120 is operable to compare a seed domain's MX record with a candidate domain's MX record and determine whether there is a MX record match, even if the seed domain and the candidate domain are not the same or even similar.

Additionally or alternatively, brand-owned domain name discovery module 120 is operable to obtain and/or maintain a secure sockets layer (SSL) certificate for a seed domain under processing. SSL certificates are small data files that digitally bind a cryptographic key to an entity or organization's details in order to provide secure, encrypted communications between a website and an Internet browser. In this case, brand-owned domain name discovery module 120 is operable to compare a seed domain's SSL certificate with a candidate domain's SSL certificate and determine whether the SSL certificate details match, even if the seed domain and the candidate domain are not the same or even similar.

In some embodiments, brand-owned domain name discovery module 120 is also communicatively connected to WHOIS server 150. WHOIS is a query and response protocol for querying WHOIS databases (e.g., WHOIS database 160) that store domain registration information such as a domain name, an IP address block, or an autonomous system. WHOIS server 150 is configured to, responsive to a WHOIS query, access WHOIS database 160, retrieve records that match the WHOIS query, and return publicly available domain registration information such as the contact person(s) and technical configuration for the requested domain. If the domain registration information was made private by the registrant, WHOIS server 150 returns a generic listing of the registrar and not the specifics of the contact person(s) for the requested domain.

Additionally or alternatively, brand-owned domain name discovery module 120 is operable to obtain and/or maintain infrastructure information associated with each seed domain from the registrant of the seed domain (e.g., through a user interface on client device 101). This is further described below.

Figure 2:
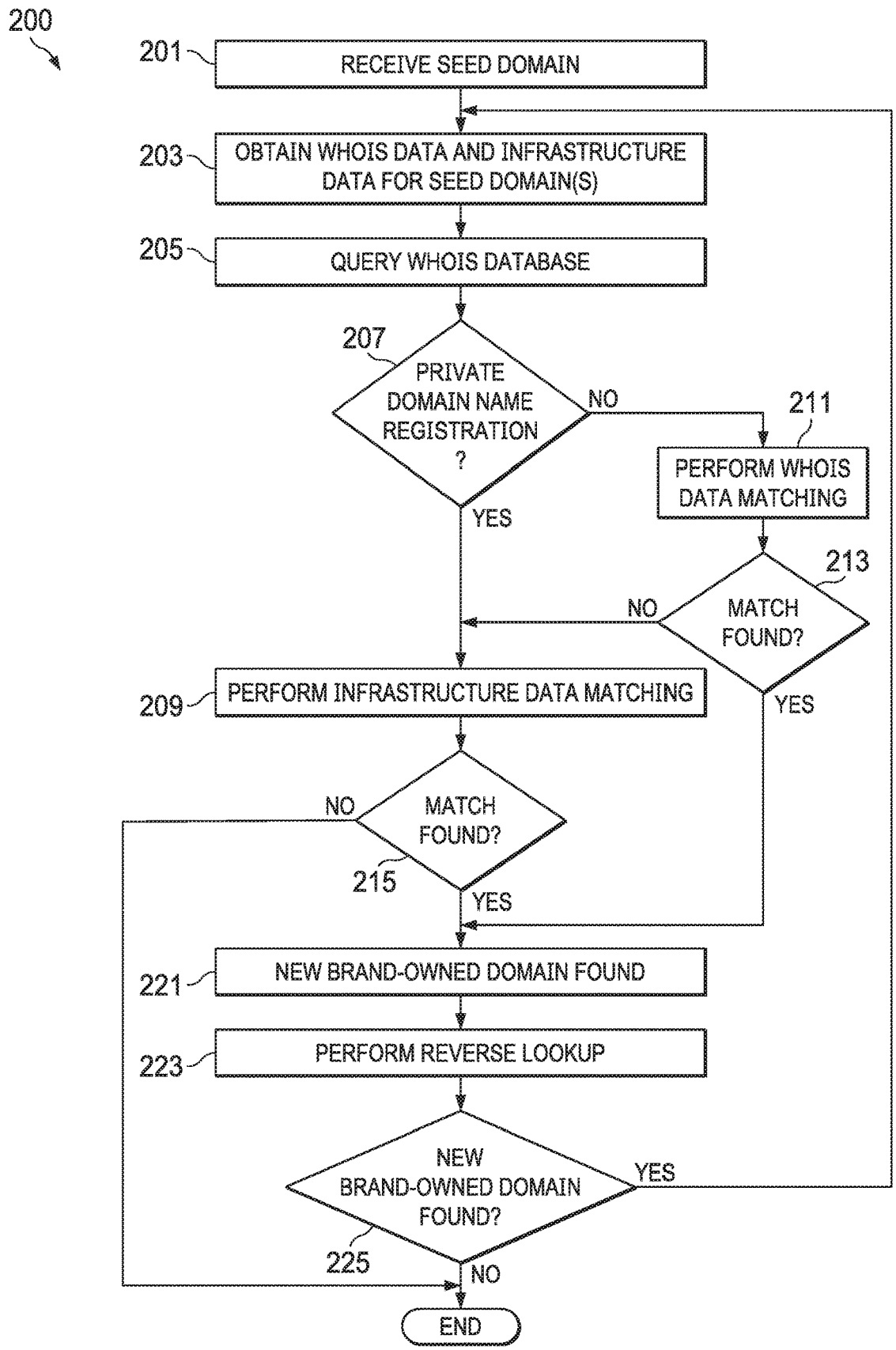
FIG. 2 is a flow diagram illustrating an example of a method for automatic discovery of brand-owned domain names according to some embodiments disclosed herein.

FIG. 2 is a flow diagram illustrating an example of a method for automatic discovery of brand-owned domain names according to some embodiments disclosed herein. In the example of FIG. 2, process 200 begins with receipt of a brand-owned domain name (201). As discussed above, this brand-owned domain name is referred to as a seed domain. In some embodiments, an authorized user (e.g., an employee of the brand or the company owning the brand, an administrator of a DNDAP system, etc.) may provide the seed domain through a user interface (e.g., a user interface of the DNDAP system). A non-limiting example of user interface 300 configured for receiving a seed domain is depicted in FIG. 3.

In some embodiments, responsive to receipt of a new seed domain (e.g., "mycompany.com") through user interface 300, the DNDAP system implementing process 200 may operate to obtain WHOIS data and infrastructure data for all the seed domains owned by the registrant of the new seed domain (203). In such cases, new brand-owned domain names may be discovered in near real time. In some embodiments, process 200 can be initiated on demand or per a pre-defined schedule, independently of how and/or when a new brand-owned domain name is received. In such cases, process 200 can begin with obtaining WHOIS data and infrastructure data for all the seed domains owned by an entity (e.g., a brand or a company).

In some embodiments, the DNDAP system may operate to request domain name registration information through its user interface. This can be useful when a seed domain has private or proxied WHOIS registration information. FIG. 4 depicts a diagrammatic representation of an example of user interface 400 that, in some embodiments, can be utilized to obtain infrastructure information such as IP or range of IPs, ASN, and/or other details that can aid in identifying domains owned by a user's organization.

Referring to FIG. 2, the DNDAP system is configured for performing multiple iterations of process 200 to detect or otherwise discover domain names owned by a specific brand, company, organization, or registrant. In each iteration, the DNDAP system utilizes WHOIS data and infrastructure data of brand-owned domain names (seed domains) to discover new brand-owned domain names. As explained below, this iterative discovery process continues until no more brand-owned domain names could be found.

As illustrated in FIG. 2, process 200 utilizes WHOIS data and infrastructure data in two subprocesses. First, the DNDAP system is operable to scan/query a WHOIS database, for instance, through a WHOIS server as discussed above (205). The DNDAP system may contact multiple WHOIS servers to inquire about desired WHOIS domain name registration information.

WHOIS data that can be utilized by the DNDAP system in the iterative discovery process can include, for instance, the registrant's name, the registrant's physical location address, the registrant's phone number, the registrant's email address, the registrant's name servers, the registrant's fax number, the technical email address, the administrative email address, the contact email address, the registrar's name, the domain creation date, the registrant organization, etc. The WHOIS database can be considered a searchable public Internet directory that stores all these details for domain name registrants. When a registrant registers a domain name with a registrar, the registrar is required by ICANN to collect the registrant's contact information, including the registrant's name, physical address, email address, phone number, business name, etc., in its WHOIS database. All registrant details are considered public information. This means that a registrant's personal information is available to any member of the public who accesses the registrar's WHOIS database.

In some cases, a registrant may wish to make their domain registration information private. In such cases, a registrar may anonymize a registrant's personal information with a generic registrar-generated information set. The generic registrar-generated information set is stored in the registrar's WHOIS database, masking the registrant's personal information. Interested parties can still get in touch with the registrant of the privately registered domain name through the registrar, but the registrant's domain name registration information is not available publicly through the WHOIS database.

In some embodiments, the DNDAP system can determine whether the domain name registration for the seed domain under processing is public or private (207). If the domain name registration for the seed domain under processing is not private, this means that the WHOIS data such as the registrant's email address from the WHOIS database (205) can be used to locate matches and the DNDAP system can operate to perform a subprocess which includes a WHOIS data matching procedure (211). If the domain name registration for the seed domain under processing is private, the DNDAP system does not utilize the WHOIS data from the WHOIS database (205) but instead performs a subprocess which includes an infrastructure data matching procedure (209).

In some embodiments, the WHOIS data matching procedure can include performing the following matches:
  Full match: This can entail searching the WHOIS data for a full match of the registrant's domain name registration information such as the registrant's email address, a technical email address, an administrative email address, a contact email address, a phone number, a fax number, a street address, etc.
  Fuzzy match: This can entail searching the WHOIS data for a fuzzy match of the registrant's name, the registrant's organization (or brand or company) name. A brand can have multiple business entities across different geo locations. Each entity can have different business structure such as "LLC," "LTD," "Inc.," "GMBH," etc. Unlike a full match which requires an exact match of each character in a string, a fuzzy match is based on a string meeting a fuzzy match threshold which is based on the length of the string (e.g., the number of characters in the string) and the matching ratio (e.g., 9 out of 10 characters in a candidate domain registrant's name match the seed domain registrant's name).
  Domain match: This can entail parsing WHOIS field(s) and extracting a domain name from a candidate domain registrant's email address, technical email address, administrative email address, contact email address, name servers, etc. The domain name thus extracted is then compared with the seed domain to determine whether a brand-owned domain name is used to register the candidate domain.

In some embodiments, to avoid false positives, the DNDAP system may consider a match found (213) if at least two full matches can be found or if at least one fuzzy match/domain match and one full match can be found. If the DNDAP system cannot find any matches using WHOIS data points, the infrastructure data matching procedure is performed (209).

As illustrated in FIG. 2, the infrastructure data matching procedure can be triggered either when the domain name registration of a seed domain is private or proxied (i.e., the seed domain is registered by a third party) or when the domain name registration of a seed domain is not private but the WHOIS data matching procedure found no matches. In some embodiments, the infrastructure data matching procedure (209) can include performing the following matches:

Full match: This can entail fully matching an IP address, an ASN, an organization controlling the ASN, a SSL certificate subject, a subject alternate name, MX record, etc.

Configuration parameter match: This can entail fully matching a user-provided (for instance, through user interface 400 shown in FIG. 4) configuration parameters (or registration parameters) such as a full email address, IP address, IP address range, ASN, etc. with those found in infrastructure data obtained from various sources (e.g., infrastructure data source or Internet resources 140). In some embodiments, the DNDAP system may parse the user-provided email address to extract a candidate domain name and compare the candidate domain name thus extracted with the seed domain.

The infrastructure data matching procedure does not consider fuzzy matches. Rather, a match is considered found through the infrastructure data matching procedure (215) only if a full match can be found. If the infrastructure data matching procedure cannot find any matches, process 200 ends.

Through either of the subprocesses of process 200 described above, a new brand-owned domain name may be found (221). In some embodiments, the DNDAP system is further operable to perform another subprocess that includes a reverse lookup procedure (223). A non-limiting example of a WHOIS reverse lookup procedure is illustrated in FIG. 5.

In some embodiments, WHOIS reverse lookup procedure 500 utilizes the new brand-owned domain name found through either of the subprocesses of process 200 described above as a domain of interest and obtains its WHOIS data (501). From the WHOIS data, WHOIS reverse lookup procedure 500 is operable to determine registration details such as a registered email address (503). If the registered email address is a generic registrar-generated email address, this indicates that registration for the domain of interest is private (505). The generic registrar-generated email address cannot be used for performing a WHOIS reverse lookup for additional brand-owned domain names. Accordingly, WHOIS reverse lookup procedure 500 ends and/or returns a message that no match could be found (507). If registration for the domain of interest is not private, the DNDAP system is operable to query, through the WHOIS server, the WHOIS database using the registered email address (511). This is referred to as a WHOIS reverse lookup because, instead of using a domain name to search for its registration details, a registration detail such as a registered email address is used to look up domain names associated therewith. In response to the query, the WHOIS server sends the DNDAP system any and all domains that have an email address that fully matches the registered email address. WHOIS reverse lookup procedure 500 then returns the result from the reverse lookup to process 200. The registered email address can be any email address that is in the registration details (e.g., the registrant's email address, the technical email address, the administrative email address, the contact email address, etc.).

Figure 5:
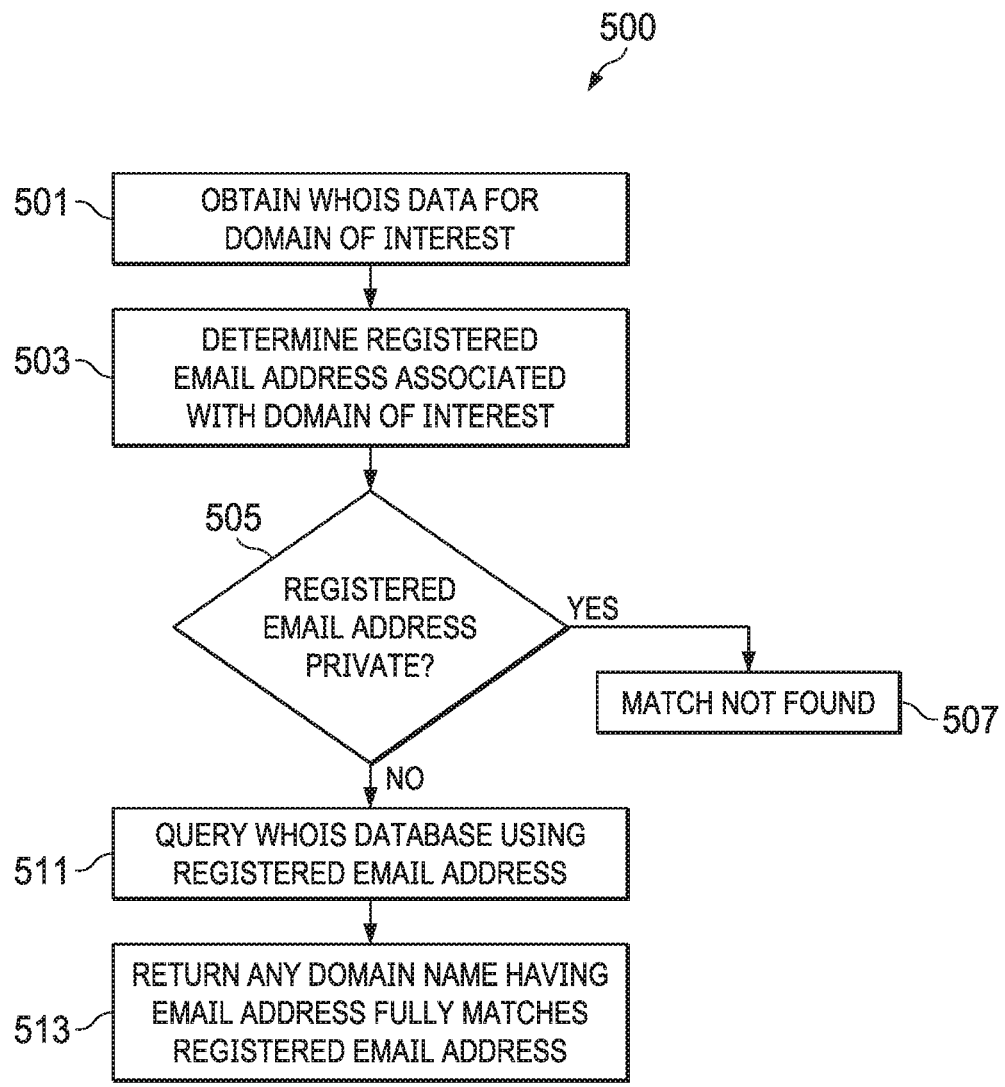
FIG. 5 is a flow diagram illustrating an example of a reverse lookup method according to some embodiments disclosed herein.

Although not shown in FIG. 5, additionally or alternatively, the DNDAP system is operable to perform an infrastructure reverse lookup procedure using infrastructure data (e.g., name servers, IP addresses, ASN, ASN owner information, MX records information, etc.). Such an infrastructure reverse lookup procedure can be useful because some companies may choose to make their WHOIS information private.

Referring to FIG. 2, a determination is made as to whether any new brand-owned domain name has been found through the reverse lookup procedure (225). If no new brand-owned domain name is found, process 200 ends. If a new brand-owned domain name is found through the reverse lookup procedure, process 200 loops back for another iteration in which the DNDAP system utilizes the new brand-owned domain name as a seed domain and obtains its WHOIS data and infrastructure data (203). As illustrated in FIG. 2, process 200 can loop back automatically iteratively until no brand-owned domain could be found (225) through the reverse lookup procedure.

The reverse lookup procedure enables faster search results for brand association data discovery and reduces the need for a full scan of the WHOIS database. Through the reverse lookup procedure described above, the DNDAP system can, without any manual configuration, automatically discover brand-owned domain names that do not match a user-provided seed domain.

This zero-configuration approach overcomes the tedious, time-consuming, and error-prone manual discovery of domain names owned by a brand or a sub-brand. Further, even if some domain names do not fully match a seed domain, the iterative process described above can still discover related brand names automatically. Also, due to the iterative nature of automatic discoveries, this approach scales well.

In some embodiments, in performing a match described above, the DNDAP system can apply matching rules systematically, consistently, reproducibly. Different rules may apply to different registration details. Below is a non-limiting example of pseudo code implementing rules for determining if a domain is a brand-owned domain:

```
Seed domain collect registration email address:
    If seed email address field is not empty, then
        Check if seed email address is not privacy email address:
            Check If domain name email address is not empty and not private:
                If domain email address full matches seed email address:
                    Brand owned domain found
                Else
                    Parse domain name from domain email address
            If Parsed domain name from domain email matches seed domain name
                Brand owned domain found
            If email is privacy email, use IP Address ASN and if seed ASN and domain ASN are exactly same:
                Brand owned domain found.
        Else:
            Check seed registration organization name is not empty
                Remove ( "llc", "gmbh" , "adr" ) strings from seed registration organization name
                Lower string seed registration organization name
                Remove - ,; , : and other special characters from seed registration organization name
                Check if domain registration organization contains seed registration organization name string:
                    Brand owned domain found
```

In some embodiments, the reverse lookup procedure can be performed after all the new brand-owned domains are found using the above-described process. Below is a non-limiting example of pseudo code implementing rules for a WHOIS reverse lookup:

```
Check registered email addresses of all those brand owned domains
    Check if email address is not empty
        If email address is not private
        Make reverse lookup into WHOIS database for full registered email address
            Find more brand owned domain names using full registered email address
```

The DNDAP system is not limited to checking a registered email address and can check a set of WHOIS fields. If a WHOIS field is empty, the DNDAP system is operable to check the next WHOIS field, and so on. This way, if the domain name registration information for a candidate domain in the WHOIS database is incomplete, the DNDAP system can still find what is matching.

For instance, while different jurisdictions may have different sets of requirements, at a minimum, some information such as the name of the registrant has to be in the domain name registration information in the WHOIS database. Thus, the DNDAP system can start the iteration process described above from the root domain (e.g., "mycompany.com") and look for WHOIS fields (e.g., email address, organization, registrater name, street address, etc.) that are not empty. If a non-empty string exists for a WHOIS field, the DNDAP system tries to match the string with the string in the corresponding WHOIS field for the seed domain. Otherwise, the DNDAP system moves forward to check the next WHOIS field. This is not restricted by geography or jurisdiction. Rather, it may depend on the finite set of WHOIS fields in the seed domain's registration information.

The domain names thus discovered by the DNDAP system can be provided to a user through an interface. FIG. 6 depicts a diagrammatic representation of an example of user interface 600 showing thousands of domain names automatically discovered by an embodiment of the DNDAP system as being associated with the brand that owns the seed domain "mycompany.com."

The examples provided below use a domain name extracted from an email address to match the seed domain. The user names are different, but the domain name is the same.

EXAMPLE 1

A user enters a seed domain "deloitte.com" through a user interface as described above. The seed domain has the following domain name registration information in the WHOIS data:

--- deloitte.com { "registrantName": "Deloitte & Touche LLP (DELOITTE-DOM)",
"registrantCity": "HERMITAGE", "registrantStreet": "4022 SELLS DR",
"registrantCountry": "UNITED STATES", "registrantState": "TN", "registrantTelephone":
"16158827600", "registrantEmail": "hostmaster@deloitte.com",
"registrantOrganization": "Deloitte & Touche LLP (DELOITTE-DOM)",
"registrantPostalCode": "37076-2903" }

---

The registrant's email address "hostmaster@deloitte.com" is parsed to extract a domain name "deloitte.com" for a nameserver domain name match along with a fuzzy match of the registrant's name "Deloitte & Touche LLP (DELOITTE-DOM)." In this example, a new domain name "deloitteaudit.com" is found to have an email address with a domain name that fully matches the domain name "deloitte.com" and also have a nameserver host name "GLBNS1.DELOITTE.COM|GLBNS2.DELOITTE.COM|" that is a fuzzy match of the registrant's name "Deloitte & Touche LLP (DELOITTE-DOM)," as shown below:

--- deloitteaudit.com { "registrantName": "Domain Administrator", "registrantCity": "New
York", "registrantStreet": "30 Rockefeller Plaza,", "registrantCountry": "UNITED
STATES", "registrantState": "NY" ,"registrantTelephone": "16157385000",
"registrantEmail": "dttdomainadmin@deloitte.com", "registrantOrganization": "Deloitte
Touche Tohmatsu", "registrantPostalCode": "10112-0015", "domainName":
"deloitteaudit.com", "NameserverhostNames":
"GLBNS1.DELOITTE.COM|GLBNS2.DELOITTE.COM|" }

---

EXAMPLE 2

A user enters a seed domain "lvmh.com" through a user interface as described above. The seed domain has the following domain name registration information in the WHOIS database:

---

Lvmh.com {"registrantName": "Darolles Lionel", "registrantCity": "Paris",
"registrantStreet": "22 avenue Montaigne", "registrantCountry": "FRANCE",
"registrantState": "", "registrantTelephone": "33144132492", "registrantEmail":
"spi @lvmh.fr", "registrantOrganization": "LVMH", "registrantPostalCode": "75008" }

---

Based on WHOIS fields for the registrant's email address, the registrant's street address, and the registrant's city, the following domains are found in the first iteration:

--- lvmh.us {"registrantName": "Lionel Darolles", "registrantCity": "Paris", "registrantStreet":
"22 avenue Montaigne", "registrantCountry": "FRANCE", "registrantState": "", -continued "registrantTelephone": "330147058727", "registrantEmail": "spi@lvmh.fr",
"registrantOrganization": "LVMH MOET HENNESSY LOUIS VUITTON",
"registrantPostalCode": "75008"}
Lvmh.net { "registrantName": "Darolles Lionel", "registrantCity": "Paris",
"registrantStreet": "22 avenue Montaigne", "registrantCountry": "FRANCE",
"registrantState": "", "registrantTelephone": "33144132492", "registrantEmail":
"spi@lvmh.fr", "registrantOrganization": "LVMH"}

Based on above results, this first iteration reveals new information "LVMH MOET HENNESSY LOUIS VUITTON" about the registrant organization "LVMH." This new information can be used in the next iteration to learn more information about organization and match new records such as:

lvmh.fr { registrantName":"", "registrantCity": "", "registrantStreet": "30, avenue Hoche",
"registrantCountry": "FRANCE", "registrantState": "", "registrantTelephone": "33 1 44 13
22 22", "registrantEmail": "b.bernard@lvmh.fr", "registrantOrganization": "LVMH MOET
HENNESSY LOUIS VUITTON" }

In this case, even though the registrant's physical address and the registrant's email address for the new domain name "Ivmh.fr" are different from those associated with the user-provided seed domain "Ivmh.com," the registrant organization "LVMH MOET HENNESSY LOUIS VUITTON" for the new domain name "Ivmh.fr" is an exact match of the registrant organization for the new domain name "Ivmh.us" found in the first iteration.

Based on the new domain name "Ivmh.fr" found in the second iteration, the DNDAP system now has new email address details with which it can query the WHOIS database for a reverse lookup which, in turn, can potentially discover more domain name associations.

As more enterprises, organizations, and companies alike making their WHOIS information private, it may become harder to obtain registration details from the WHOIS database. Accordingly, in some embodiments, the reverse lookup process can, alternatively or additionally, include using infrastructure data to identify brand-owned domains. As discussed above, infrastructure data can generally include name servers, IP addresses, ASN, ASN owner information, and MX records information. As a non-limiting example, suppose a brand-owned seed domain contains name server records "ns1.slb.com," "ns2.slb.com," and "ns3.slb.com." The reverse lookup process is operable to reverse lookup all three entries for name servers and obtain domain names associated with those name servers. For other infrastructure fields such as MX records, IP addresses, etc., the reverse lookup process is operable to perform a similar reverse lookup and discover additional brand-owned domains.

Likewise, server certificates (e.g., SSL certificates) can be used to identify brand-owned domain names. For instance, in some embodiments, the reverse lookup process is operable to make an Hyper Text Transfer Protocol Secure (HTTPS) connection request to a seed domain (at an IP address or a corresponding Universal Resource Locator, colloquially called a web address). If the server at the IP address hosts HTTPS services (and hence operates as an HTTPS server), it should have a server certificate that is issued by one of the trusted Certificate Authorities (CAs). The format of such a server certificate is specified by the X.509 standard. The X.509 standard and CAs are known to those skilled in cryptography and thus are not further described herein. The reverse lookup process can request a server certificate from the HTTPS server operating at the seed domain's web address. The server certificate thus obtained for a seed domain can be validated and used to identify additional brand-owned domain names.

A server certificate can be validated when connecting over HTTPS. This can be done, for instance, by configuring Python to perform certificate verification for HTTPS client connections by default, using the Python standard library modules such as the Python SSL module. As another example, certificate verification can be done using any third-party modules which verify a chain of trust when connecting over HTTPS.

According to the X.509 standard, a server certificate can contain an extension called "Subject Alternative Name" or SAN. The SAN extension of a server certificate can contain DNS names that are also associated with the same server certificate. As a non-limiting example, field values of a "subjectAltName" field in a server certificate for a seed domain "wellsfargo.com" may include "wellsfargo.net," wellsfargo.us," etc. The reverse lookup process can extract such DNS names from the "subjectAltName" field in a server certificate for a seed domain and identify them as additional brand-owned domain names. Because these DNS names are extracted from a valid server certificate for a seed domain, no additional validation is necessary. In turn, these additional brand-owned domains can be stored in database 130 as seed domains and used by the reverse lookup process to discover more brand-owned domains.

Alternatively or additionally, the reverse lookup process can utilize the serial number of a server certificate to verify whether a candidate domain is associated with a seed domain. For example, the reverse lookup process can obtain the server certificate of a seed domain as described above. The server certificate contains a serial number that uniquely identifies the server certificate (by a CA that issues the server certificate). To verify whether a candidate domain is also owned by the same brand that owns the seed domain, the reverse lookup process is operable to obtain a server certificate for the candidate domain, verify whether the server certificate for the candidate domain is properly signed (through the same certificate verification process discussed above), extract the serial number from the server certificate for the candidate domain, and compare the serial number of the server certificate for the candidate domain with the serial number of the server certificate for the seed domain. If the serial numbers match, the reverse lookup process is operable to identify the candidate domain as a brand-owned domain and store it in database 130 as a seed domain. The reverse lookup process can use the newly discovered seed domain to look for more brand-owned domains, again through querying the WHOIS database and/or utilizing the infrastructure data (e.g., name servers, IP addresses, ASN, ASN owner information, MX records information, server certificates, etc.). The above-described reverse lookup process can reiterate until no more brand-owned domains can be found.

Figure 7:
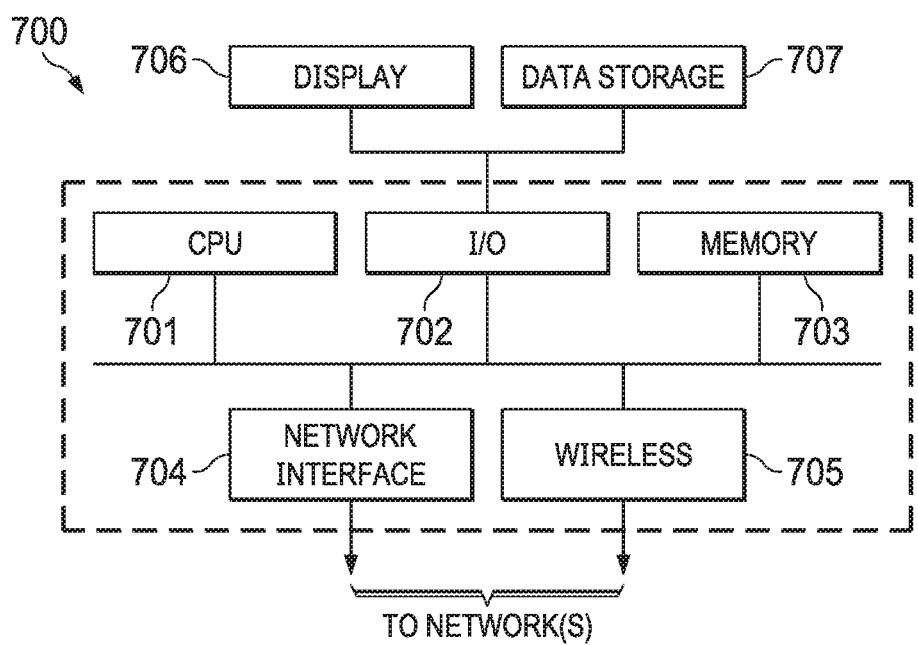
FIG. 7 depicts a diagrammatic representation of a data processing system for implementing a system for automatic discovery of brand-owned domain names according to some embodiments disclosed herein.

FIG. 7 depicts a diagrammatic representation of a data processing system for implementing the DNDAP system. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to external computers or other devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for domain name discovery, comprising:
   obtaining WHOIS data and infrastructure data for a seed domain, the obtaining performed by a domain name discovery server computer, the WHOIS data containing domain name registration information for the seed domain;
   determining, by the domain name discovery server computer, whether the domain name registration information for the seed domain is private;
   responsive to the domain name registration information for the seed domain being private, performing an infrastructure data matching procedure utilizing the infrastructure data for the seed domain, the infrastructure data matching procedure performed by the domain name discovery server computer;
   responsive to the domain name registration information for the seed domain not being private, performing a WHOIS data matching procedure utilizing the WHOIS data for the seed domain, the WHOIS data matching procedure performed by the domain name discovery server computer;
   iteratively performing, by the domain name discovery server computer, the obtaining and the determining for each domain name found through the infrastructure data matching procedure or through the WHOIS data matching procedure until no domain name is found;
   performing, by the domain name discovery server computer, a reverse lookup procedure for each domain name found through the infrastructure data matching procedure or through the WHOIS data matching procedure, the reverse lookup procedure comprising:
      obtaining, from a WHOIS database, WHOIS data for the each domain name;
      determining a registered WHOIS field value from the WHOIS data for the each domain name; and
      querying the WHOIS database for domain names having a registered WHOIS field value that fully matches the registered WHOIS field value for the each domain name, wherein the registered WHOIS field value comprises a registered email address, wherein the reverse lookup procedure further comprises, prior to determining the registered email address from the WHOIS data:
         determining whether a first WHOIS field for the registered email address is empty; and responsive to the first WHOIS field being empty, determining whether a second WHOIS field associated with the registered email address is empty; and generating, by the domain name discovery server computer, a user interface for presenting, on a client device communicatively connected to the domain name discovery server computer, domain names discovered through the WHOIS data matching procedure, the infrastructure data matching procedure, and the reverse lookup procedure.

2. The method according to claim 1, wherein the reverse lookup procedure further comprises, prior to determining the registered email address from the WHOIS data:

iteratively determining whether a WHOIS field associated with the registered email address is empty until a non-empty WHOIS field associated with the registered email address is found, wherein the registered email address is determined from the non-empty WHOIS field.

3. The method according to claim 1, wherein the WHOIS data matching procedure comprises performing a plurality of matches, the plurality of matches including a full match of a first registration detail in the domain name registration information for the seed domain, a fuzzy match of a second registration detail in the domain name registration information for the seed domain, and a domain match of any domain name registered using the seed domain.

4. The method according to claim 3, wherein the WHOIS data matching procedure outputs a domain name that has at least two registration details that fully match corresponding registration details of the seed domain, that has at least one full match and one fuzzy match, or that has at least one full match and one domain match.

5. The method according to claim 1, wherein the infrastructure data matching procedure comprises performing a plurality of matches, the plurality of matches including a full match of an infrastructure detail in the infrastructure data for the seed domain and a configuration parameter match of a user-provided configuration parameter of the seed domain.

6. The method according to claim 5, wherein the infrastructure data matching procedure outputs a domain name that has an Internet Protocol (IP) address, an Autonomous System Number (ASN), a secure sockets layer (SSL) certificate, a mail exchange (MX) record, or a configuration parameter that fully matches a corresponding IP address, ASN, SSL certificate, MX record, or configuration parameter of the seed domain.

7. The method according to claim 1, wherein the reverse lookup procedure further comprises:

determining infrastructure data for the each domain name; and querying an infrastructure data source for domain names having the infrastructure data that match the infrastructure data for the each domain name.

8. A domain name discovery system, comprising:

a processor;

a non-transitory computer-readable medium; and stored instructions translatable by the processor to perform:

obtaining WHOIS data and infrastructure data for a seed domain, the WHOIS data containing domain name registration information for the seed domain;

determining whether the domain name registration information for the seed domain is private;

responsive to the domain name registration information for the seed domain being private, performing an infrastructure data matching procedure utilizing the infrastructure data for the seed domain;

responsive to the domain name registration information for the seed domain not being private, performing a WHOIS data matching procedure utilizing the WHOIS data for the seed domain;

iteratively performing the obtaining and the determining for each domain name found through the infrastructure data matching procedure or through the WHOIS data matching procedure until no domain name is found;

performing a reverse lookup procedure for each domain name found through the infrastructure data matching procedure or through the WHOIS data matching procedure, the reverse lookup procedure comprising:

obtaining, from a WHOIS database, WHOIS data for the each domain name;

determining a registered WHOIS field value from the WHOIS data for the each domain name; and querying the WHOIS database for domain names having a registered WHOIS field value that fully matches the registered WHOIS field value for the each domain name, wherein the registered WHOIS field value comprises a registered email address, wherein the reverse lookup procedure further comprises, prior to determining the registered email address from the WHOIS data:

determining whether a first WHOIS field for the registered email address is empty; and responsive to the first WHOIS field being empty, determining whether a second WHOIS field associated with the registered email address is empty; and generating a user interface for presenting, on a client device communicatively connected to the domain name discovery system, domain names discovered through the WHOIS data matching procedure, the infrastructure data matching procedure, and the reverse lookup procedure.

9. The domain name discovery system of claim 8, wherein the reverse lookup procedure further comprises, prior to determining the registered email address from the WHOIS data:

iteratively determining whether a WHOIS field associated with the registered email address is empty until a non-empty WHOIS field associated with the registered email address is found, wherein the registered email address is determined from the non-empty WHOIS field.

10. The domain name discovery system of claim 8, wherein the WHOIS data matching procedure comprises performing a plurality of matches, the plurality of matches including a full match of a first registration detail in the domain name registration information for the seed domain, a fuzzy match of a second registration detail in the domain name registration information for the seed domain, and a domain match of any domain name registered using the seed domain.

11. The domain name discovery system of claim 10, wherein the WHOIS data matching procedure outputs a domain name that has at least two registration details that fully match corresponding registration details of the seed domain, that has at least one full match and one fuzzy match, or that has at least one full match and one domain match.

12. The domain name discovery system of claim 8, wherein the infrastructure data matching procedure comprises performing a plurality of matches, the plurality of matches including a full match of an infrastructure detail in the infrastructure data for the seed domain and a configuration parameter match of a user-provided configuration parameter of the seed domain.

13. The domain name discovery system of claim 12, wherein the infrastructure data matching procedure outputs a domain name that has an Internet Protocol (IP) address, an Autonomous System Number (ASN), a secure sockets layer (SSL) certificate, a mail exchange (MX) record, or a configuration parameter that fully matches a corresponding IP address, ASN, SSL certificate, MX record, or configuration parameter of the seed domain.

14. The domain name discovery system of claim 8, wherein the reverse lookup procedure further comprises:
   determining infrastructure data for the each domain name; and
   querying an infrastructure data source for domain names having the infrastructure data that match the infrastructure data for the each domain name.

15. A computer program product comprising a non-transitory computer-readable medium storing instructions translatable by a domain name discovery server computer to perform:
   obtaining WHOIS data and infrastructure data for a seed domain, the WHOIS data containing domain name registration information for the seed domain;
   determining whether the domain name registration information for the seed domain is private;
   responsive to the domain name registration information for the seed domain being private, performing an infrastructure data matching procedure utilizing the infrastructure data for the seed domain;
   responsive to the domain name registration information for the seed domain not being private, performing a WHOIS data matching procedure utilizing the WHOIS data for the seed domain;
   iteratively performing the obtaining and the determining for each domain name found through the infrastructure data matching procedure or through the WHOIS data matching procedure until no domain name is found;
   performing a reverse lookup procedure for each domain name found through the infrastructure data matching procedure or through the WHOIS data matching procedure, the reverse lookup procedure comprising:
      obtaining, from a WHOIS database, WHOIS data for the each domain name;
      determining a registered WHOIS field value from the WHOIS data for the each domain name; and
      querying the WHOIS database for domain names having a registered WHOIS field value that fully matches the registered WHOIS field value for the each domain name, wherein the registered WHOIS field value comprises a registered email address, wherein the reverse lookup procedure further comprises, prior to determining the registered email address from the WHOIS data:
         determining whether a first WHOIS field for the registered email address is empty; and
         responsive to the first WHOIS field being empty, determining whether a second WHOIS field associated with the registered email address is empty; and
   generating a user interface for presenting, on a client device communicatively connected to the domain name discovery server computer, domain names discovered through the WHOIS data matching procedure, the infrastructure data matching procedure, and the reverse lookup procedure.

16. The computer program product of claim 15, wherein the reverse lookup procedure further comprises, prior to determining the registered email address from the WHOIS data:
   iteratively determining whether a WHOIS field associated with the registered email address is empty until a non-empty WHOIS field associated with the registered email address is found, wherein the registered email address is determined from the non-empty WHOIS field.

17. The computer program product of claim 15, wherein the WHOIS data matching procedure comprises performing a plurality of matches, the plurality of matches including a full match of a first registration detail in the domain name registration information for the seed domain, a fuzzy match of a second registration detail in the domain name registration information for the seed domain, and a domain match of any domain name registered using the seed domain.

18. The computer program product of claim 17, wherein the WHOIS data matching procedure outputs a domain name that has at least two registration details that fully match corresponding registration details of the seed domain, that has at least one full match and one fuzzy match, or that has at least one full match and one domain match.

19. The computer program product of claim 15, wherein the infrastructure data matching procedure comprises performing a plurality of matches, the plurality of matches including a full match of an infrastructure detail in the infrastructure data for the seed domain and a configuration parameter match of a user-provided configuration parameter of the seed domain, wherein the infrastructure data matching procedure outputs a domain name that has an Internet Protocol (IP) address, an Autonomous System Number (ASN), a secure sockets layer (SSL) certificate, a mail exchange (MX) record, or a configuration parameter that fully matches a corresponding IP address, ASN, SSL certificate, MX record, or configuration parameter of the seed domain.

20. The computer program product of claim 15, wherein the reverse lookup procedure further comprises:
   determining infrastructure data for the each domain name; and
   querying an infrastructure data source for domain names having the infrastructure data that match the infrastructure data for the each domain name.

* * * * *